United States Patent
Miletto et al.

(10) Patent No.: US 11,537,159 B2
(45) Date of Patent: Dec. 27, 2022

(54) PEDAL POSITION ADJUSTING MECHANISM

(71) Applicant: PLASTIC COMPONENTS AND MODULES AUTOMOTIVE S.p.A., Turin (IT)

(72) Inventors: Beniamino Miletto, Turin (IT); Renato Antonio Cavaglia', Turin (IT)

(73) Assignee: PLASTIC COMPONENTS AND MODULES AUTOMOTICE S.P.A., Turin (IT)

( * ) Notice: Subject to any disclaimer, the term of this patent is extended or adjusted under 35 U.S.C. 154(b) by 0 days.

(21) Appl. No.: 17/483,511

(22) Filed: Sep. 23, 2021

(65) Prior Publication Data
US 2022/0011806 A1    Jan. 13, 2022

Related U.S. Application Data

(63) Continuation-in-part of application No. 17/224,036, filed on Apr. 6, 2021, now abandoned.

(30) Foreign Application Priority Data

Apr. 9, 2020    (IT) .................... 102020000007639

(51) Int. Cl.
    *G05G 1/40*    (2008.04)
    *G05G 1/405*   (2008.04)
    (Continued)

(52) U.S. Cl.
    CPC .............. *G05G 1/405* (2013.01); *B60K 26/02* (2013.01); *B60T 7/06* (2013.01)

(58) Field of Classification Search
    CPC ............ G05G 1/405; G05G 1/40; G05G 1/30; G05G 1/32; G05G 1/34; G05G 1/36;
    (Continued)

(56) References Cited

U.S. PATENT DOCUMENTS 4,875,385 A * 10/1989 Sitrin ..................... B60T 7/04
                                                  74/513
6,151,986 A   11/2000 Willemsen
                (Continued)

FOREIGN PATENT DOCUMENTS

JP      H0239214 A      2/1990
WO      2009/019589 A2  2/2009

OTHER PUBLICATIONS

Search Report for IT 2020000007639 dated Aug. 13, 2020.
Written Opinion for IT 2020000007639 dated Aug. 13, 2020.
Office Action for U.S. Appl. No. 17/224,306 dated Aug. 11, 2021.

Primary Examiner — Brian J McGovern
(74) Attorney, Agent, or Firm — Ferguson Case Orr Paterson (57) ABSTRACT

An assembly for a vehicle comprising a mechanism for adjusting the angular position of a vehicle pedal includes a motor for generating and transmitting rotary motion to a rotating member, a first pedal assembly having a first support frame with a first slotted hole, rotatably supported on a first fulcrum and supporting a first pedal, a first motion conversion mechanism, having a first rotating member rotatable about a first rotation axis and a first translating member, receiving and converting rotational motion into translational motion, and a first pin, for joint translation with the first translating member and sliding inside the first slotted hole. Sliding of the first pin draws the first support frame in rotation about the first fulcrum between a first and a second angular position. The mechanism includes a second pedal assembly. The first rotating member is connected to the motor to receive rotary motion. A second rotating member of a second motion conversion mechanism is connected in rotation to the first rotating member through a flexible transmission.

7 Claims, 5 Drawing Sheets

(51) Int. Cl.
*B60K 26/02* (2006.01)
*B60T 7/06* (2006.01)

(58) Field of Classification Search
CPC . G05G 1/38; G05G 1/44; G05G 1/445; B60K 26/02; B60K 2026/026; B60K 2026/024; B60K 2023/025; B60K 2023/005; B60T 7/04; B60T 7/06; B60T 7/065
See application file for complete search history.

(56) References Cited

U.S. PATENT DOCUMENTS

| | | |
|---|---|---|
| 6,389,927 B1 | 5/2002 | Willemsen |
| 7,146,876 B2 | 12/2006 | Wullemsen |
| 2003/0005790 A1 | 1/2003 | Liimatta et al. |
| 2003/0056615 A1* | 3/2003 | Oberheide ............. G05G 1/405 74/512 |
| 2003/0080706 A1 | 5/2003 | Waite |
| 2005/0166702 A1 | 8/2005 | Rixon et al. |
| 2007/0137397 A1 | 6/2007 | Choi |
| 2009/0223319 A1 | 9/2009 | Choi |
| 2015/0107401 A1* | 4/2015 | Farrell .................... B60T 7/042 74/512 |

* cited by examiner

PEDAL POSITION ADJUSTING MECHANISM

CROSS REFERENCE TO RELATED APPLICATION

This application claims priority to and benefit of Italian Patent Application No. 102020000007639, filed on Apr. 9, 2020, and is a continuation-in-part of U.S. patent application Ser. Ser. No. 17/224,036 to Miletto et al., filed on Apr. 6, 2021, each of which is fully incorporated by reference herein in its entirety.

FIELD OF THE INVENTION

The present invention generally relates to an assembly comprising an adjusting mechanism for adjusting the angular position of an assembly of pedals of a vehicle.

BACKGROUND OF THE INVENTION

In order to ensure maximum comfort for the driver, steering wheel or seat adjustment systems are generally known which are suitable for modifying the relative position of the driver with respect to the driving commands, in particular with respect to the steering wheel and with respect to the pedals, such as sliding adjustment systems in which the steering wheel or seat is mounted slidably on respective rails.

However, by adjusting the position of the seat only or the steering wheel only it is not possible to take into account differences in height of drivers or the size of the legs and feet. This means that, by adjusting the position of the seat or the steering wheel, an optimal and safe position of the driver's foot on the pedal is not always ensured, nor is sufficient space ensured for the mobility of the driver's legs. Naturally, this adversely affects safety and accuracy of commands given by the driver to the pedals.

Different types of devices are available on the market including a motor, which, with suitable return mechanisms, moves a pedal to the desired position.

SUMMARY OF THE INVENTION

An object of the present invention is to provide an alternative adjusting mechanism for adjusting the relative position of the driver with respect to the pedals, and in particular for adjusting the angular position of a first and of a second pedal of a vehicle that does not suffer from the drawbacks of the prior art.

This and other objects are fully achieved by an adjusting mechanism as described and claimed herein.

Advantageous embodiments of the present invention are also described.

In short, the present invention is based on the idea of providing an assembly for a vehicle comprising an adjusting mechanism for adjusting the angular position of a pedal of a vehicle, the adjusting mechanism comprising:
- a motor configured to generate and transmit a rotary motion to rotating members;
- a first pedal assembly comprising:
  - a first support frame, rotatably supported on a first fulcrum and adapted to support a first pedal, said first support frame having a first slotted hole;
  - a first motion conversion mechanism, comprising a first rotating member rotatable about a first axis of rotation and a first translating member, the first motion conversion mechanism being configured to receive the rotary motion transmitted from the motor to the first rotating member and to convert said rotary motion into a translational motion of the first translating member; and
  - a first pin arranged for joint translation with said first translating member and arranged to slide within said first slotted hole, whereby sliding of the first pin inside said first slot draws the first support frame in rotation about the first fulcrum between a first angular position and a second angular position; and
- a second pedal assembly, comprising:
  - a second support frame, rotatably supported on a second fulcrum and adapted to support a second pedal, the second support frame having a second slotted hole;
  - a second motion conversion mechanism comprising a second rotating member rotatable about a second axis of rotation and a second translating member, the second motion conversion mechanism being configured to receive the rotary motion transmitted by the motor to the second rotating member and to convert said rotary motion into a translational motion of the second translating member; and
  - a second pin, arranged for joint translation with said second translating member and arranged to slide inside said second slotted hole, whereby sliding of the second pin inside said second slotted hole draws the second support frame in rotation about the second fulcrum between a first angular position and a second angular position,
- wherein the first rotating member of the first motion conversion mechanism is connected to the motor to receive the rotary motion thereof, and the second rotating member of the second motion conversion mechanism is rotatably connected to the first rotating member via a flexible transmission;
- a first support structure arranged integral with a frame of the vehicle, and having a first guide slotted hole;
- a second support structure, rotatably supported on a third fulcrum to allow a rotation of the second pedal assembly with respect to the first support structure, the second support structure having a second guide slotted hole, the second support frame being rotatably supported on the second support structure by means of the second fulcrum;
- wherein the first support structure supports the motor, the first fulcrum, and the third fulcrum,
- wherein the first pin is further arranged slidable inside said first guide slotted hole, and wherein the second pin is further arranged slidable inside said second guide slotted hole.

Preferably, each motion conversion mechanism comprises a respective endless screw and a respective scroll slidably mounted thereon.

Advantageously, the adjusting mechanism comprises at least one position sensor adapted to detect at least one of: a position of a pin, a position of a translating member of a motion conversion mechanism, and/or an angular position of a support frame or a rotating member of the motion conversion mechanism.

By virtue of such an adjusting mechanism, it is possible to overcome the drawbacks of the prior art mentioned above.

Further features and advantages of the present invention will be clarified by the detailed description that follows, given purely by way of non-limiting example in reference to the accompanying drawings.

DETAILED DESCRIPTION

An adjusting mechanism for adjusting the angular position of a pedal is generally indicated in the figures with the reference number 10.

Figure 1:
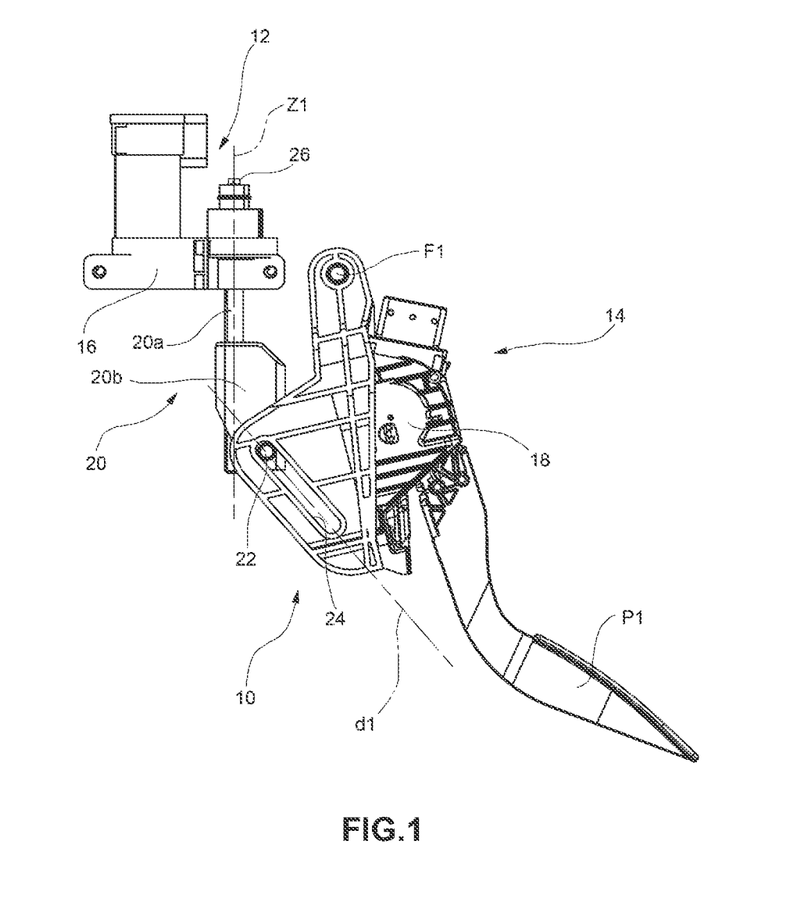
FIG. 1 is a side view of an adjusting mechanism according to an embodiment of the present invention in a first position.
Figure 2:
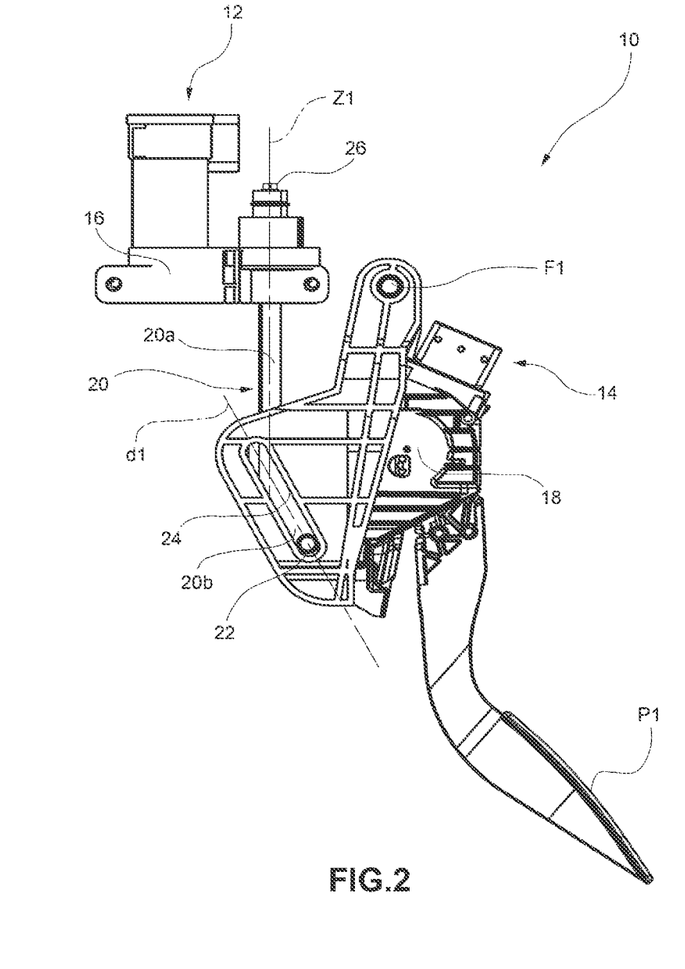
FIG. 2 is a side view of the adjusting mechanism of FIG. 1 in a second position.

With reference initially to FIGS. 1 and 2, according to a first embodiment of the present invention, an adjusting mechanism 10 comprises a motor 12, a first pedal assembly 14 and a second pedal assembly 28.

The motor 12 is configured, in a known way, to generate and transmit a rotary motion to a rotating member arranged, for example, at an output shaft of the motor 12. The motor 12 may be an electric motor. The motor 12 may be associated, in a manner known per se, with a gear reduction assembly 16 adapted to multiply the torque delivered by the motor 12 according to the dimensional requirements of the design of the adjusting mechanism 10. Preferably, the motor 12 and the gear reduction assembly 16 are made as a single assembly, so that the adjusting mechanism 10 comprises a gear motor assembly, in a manner known per se.

The first pedal assembly 14 comprises a first support frame 18, a first motion conversion mechanism 20 and a first pin 22.

The first support frame 18 is adapted to support a first pedal P1, which is mounted thereon in a manner known per se. The first pedal P1 is a conventional automotive control pedal, such as an accelerator control pedal, a brake control pedal, or a clutch control pedal. For the purposes of this description, an embodiment with only one pedal mounted on the first support frame 18 will be described; however, the present invention is not limited to this embodiment, as the first support frame 18 may also support a plurality of side-by-side pedals, such as a brake pedal and an accelerator pedal.

The first support frame 18 is rotatably supported on a first fulcrum F1 so as to be able to rotate about the first fulcrum between a first angular position and a second angular position.

A first slotted hole 24 is formed on the first support frame 18. The first slotted hole 24 is made as a through hole, preferably with an elongated cross section extending at least partially along a first extension direction d1.

The first motion conversion mechanism 20 comprises a first rotating member 20a, rotatable about a first axis of rotation z1, and a first translating member 20b. In a manner known per se, the first motion conversion mechanism 20 is adapted to receive a rotary motion transmitted by the motor 12 to the first rotating member 20a and to convert it into a translational motion of the first translating member 20b.

According to a preferable embodiment, the first rotating member 20a is made as a first endless screw 20a and the first translating member 20b is made as a first scroll 20b, which meshes with the first endless screw 20a and is adapted to translate axially along the first endless screw 20a between a first position and a second position in response to a rotation of the first endless screw 20a about the first axis of rotation z1, caused by a rotary motion received by the motor 12 and transmitted to said first scroll 20b.

The first pin 22 is arranged inserted within the first slotted hole 24. The first pin 22 has a generally rod-like shape, i.e., a simple cylinder, and is arranged for joint translation with the first translating member 20b.

The shape of the first slotted hole 24 and its arrangement on the first support frame 18 are such that, when the first translating member 20b and the first pin 22 translate along the first slotted hole 24 following the cross section thereof, the first support frame 18 is rotated about its first fulcrum F1 between the first angular position and the second angular position. In particular, when the motor 12 transmits a driving torque to the first motion conversion mechanism 20, and in particular transmits a rotary motion to the first rotating member 20a, the rotary motion is converted into a translational motion of the first translating member 20b, and, consequently, of the first pin 22 along the first slotted hole 24. In this way, the motor 12 may control, by generating a drive torque in one direction or the other, the angular position of the first support frame 18, and, consequently, of the first pedal P1 mounted thereon.

In particular, the first extension direction d1 of the first slotted hole 24 is arranged so as to be non-parallel with the first axis of rotation z1, and not to pass through the first fulcrum F1. Alternatively, the cross section of the first slotted hole 24 may be different, i.e., it may extend along an at least partially non-rectilinear path, for example curvilinear, in particular S-shaped or arched, so as to define a plurality of different angular positions of the first support frame 18.

The adjusting mechanism 10 may further comprise a first position sensor 26, adapted to determine the angular position of the first pedal P1 by detecting a correlated position. For example, the first position sensor 26 may be configured to detect the position of the first pin 22 inside the first slotted hole 24, or to detect the axial position of the first translating member 20b, or even to detect the angular position of the first rotating member 20a, of an output shaft of the motor 12, or of the first support frame 18.

Figure 5:
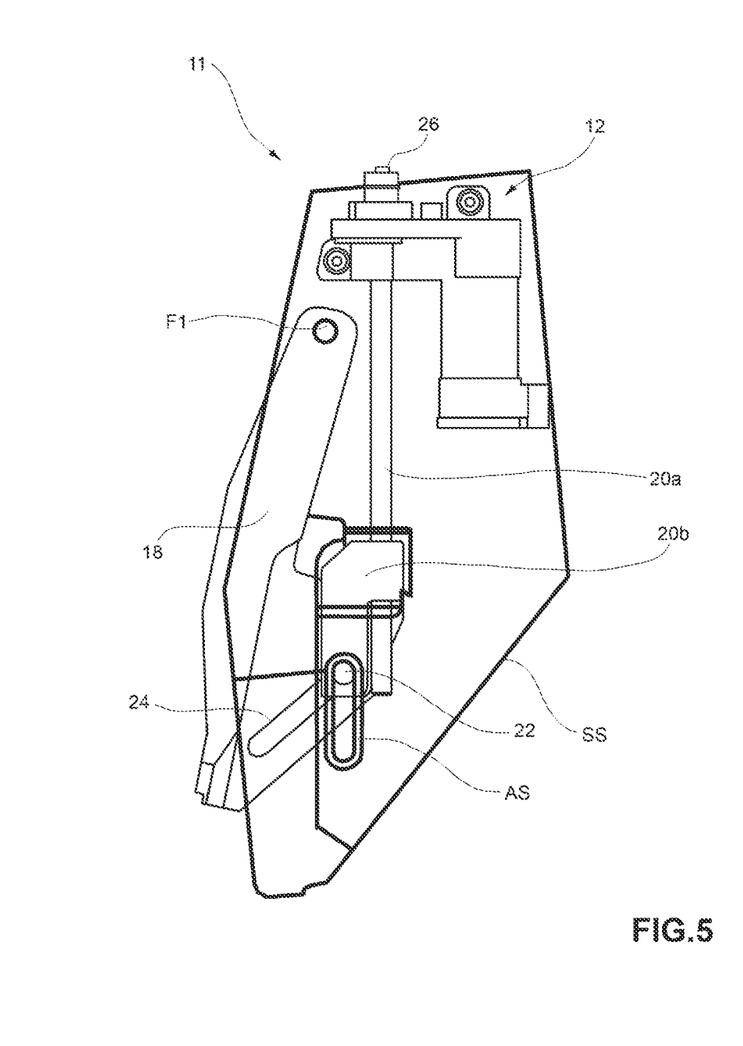
FIG. 5 is a side view showing the main components of an assembly comprising the adjusting mechanism of FIG. 1 mounted on a support plate.

FIG. 5 shows in its main parts an assembly 11 for a vehicle comprising the adjusting mechanism 10 according to the present invention, wherein the first pedal P1 and a first support structure SS are also visible. The first support frame 18 is mounted supported on the first support structure SS, integral with a vehicle frame.

The first support structure SS has a first guide slotted hole AS inside of which the first pin 22 is slidably arranged. In this way, during sliding of the first pin 22 inside the first slotted hole 24, the first pin 22 also slide inside the first guide slotted hole AS. This allows the first pin 22 to be guided in the best possible way, and to avoid any deformation of the components that transmit motion up to the first pin 22

Figure 3:
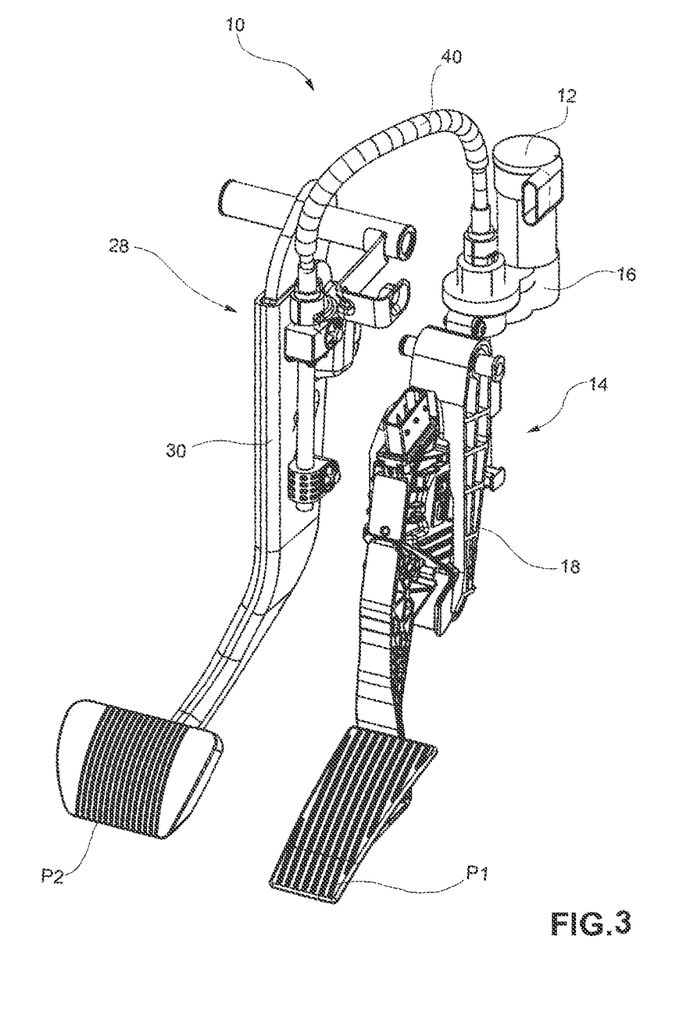
FIG. 3 is a perspective view of an adjusting mechanism according to a further embodiment of the present invention.
Figure 4:
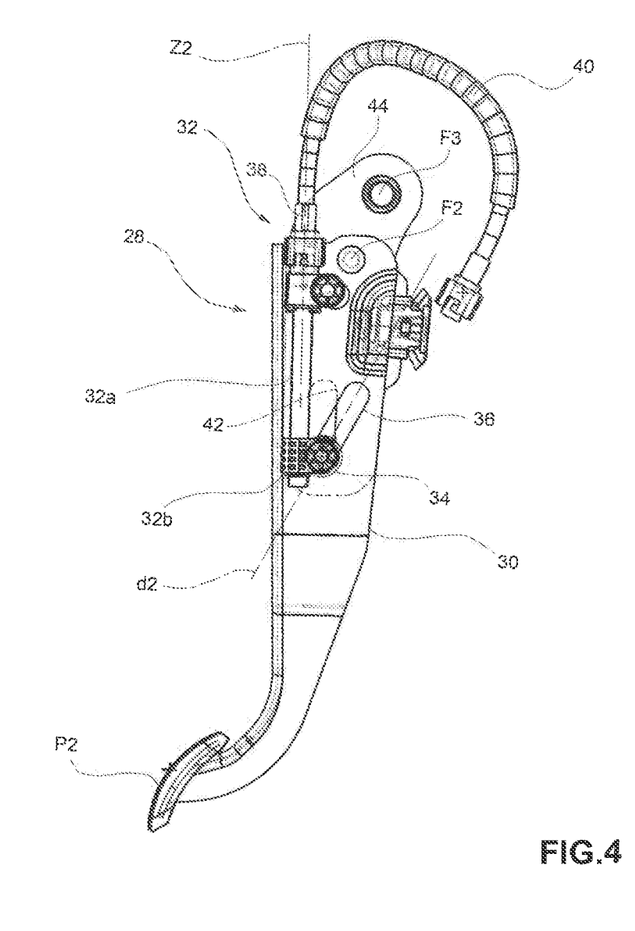
FIG. 4 is a side view of a part of the adjusting mechanism of FIG. 3.

With reference now to FIGS. 3 and 4, an embodiment of the present invention is shown, wherein the adjusting mechanism 10 further comprises a second pedal assembly 28.

The second pedal assembly 28 is made in a similar way to the first pedal assembly 14 and is shown isolated in FIG. 4.

The second pedal assembly 28 comprises a second support frame 30, a second motion conversion mechanism 32 and a second pin 34.

The second support frame 30 is adapted to support a second pedal P2, which is mounted thereon in a manner known per se. The second pedal P2 is also a conventional automotive control pedal, such as an accelerator control pedal, a brake control pedal, or a clutch control pedal. For the purposes of this description, an embodiment with only one pedal mounted on the second support frame 30 will be described; however, the present invention is not limited to this embodiment, as the second support frame 30 may also support a plurality of side-by-side pedals, such as a clutch control pedal and a brake control pedal.

The second support frame 30 is rotatably supported on a second fulcrum F2 so as to be able to rotate about the second fulcrum between a first angular position and a second angular position.

Both the first support frame 18 and the second support frame 30 (or any further support frames) are preferably made by means of a plastic injection process, or alternatively by means of a sheet metal pressing process.

A second support structure 44 is rotatably supported on a third fulcrum F3, in order to allow a rotation of the second pedal assembly 28 relative to the first support structure SS. The second support frame 30 is rotatably supported on the second support structure 44 by means of the second fulcrum F2, while the first support structure SS supports the motor 12, the first fulcrum F1 and the third fulcrum F3. Therefore, by means of the described configuration, the second pedal assembly 28 is rotatable as a whole around the third fulcrum F3 for operation of the second pedal P2, while the second support frame 30 is rotatable around the second fulcrum F2 relative to the second support structure 44 for adjusting the angular position of the second pedal assembly 28 as a whole.

The second support structure 44 has a second guide slotted hole 42 inside of which the second pin 34 is slidably arranged. In this way, during sliding of the second pin 34 inside the second slotted hole 36, the second pin 34 also slide inside the second guide slotted hole 42. This allows the second pin 34 to be guided in the best possible way, and to avoid any deformation of the components that transmit motion up to the second pin 34.

Similarly to what described with respect to the first support frame 18, a second slotted hole 36 is formed on the second support frame 30. The second slotted hole 36 is made as a through hole, preferably with an elongated cross section extending at least partially along a second extension direction d2.

The second motion conversion mechanism 32 comprises a second rotating member 32a, rotatable about a second axis of rotation z2, preferably parallel to the first axis of rotation z1, and a second translating member 32b. In a manner known per se, the second motion conversion mechanism 32 is adapted to receive a rotary motion transmitted by the motor 12 to the second rotating member 32a and to convert it into a translational motion of the second translating member 32b.

According to a preferable embodiment of the invention, the second rotating member 32a is made as a second endless screw 32a, and the second translating member 32b is made as a second scroll 32b, which meshes with the second endless screw 32a and is adapted to translate axially along the second endless screw 32a between a first position and a second position in response to a rotation of the second endless screw 32a about the second axis of rotation z2, caused by a rotary motion received from the motor 12 and transmitted to said second scroll 32b, even indirectly.

In effect, while the first rotating member 20a of the first motion conversion mechanism 20 is connected to the motor 12 to receive its rotational motion, the second rotating member 32a of the second motion conversion mechanism 32 is rotatably connected to the first rotating member 20a by a flexible transmission 40.

The connection between the first rotating member 20a and the second rotating member 32a allows the combined and simultaneous rotation of the two members and, therefore, of the first pedal assembly 14 and of the second pedal assembly 28, whereby the angular distance between the first pedal P1 and the second pedal P2 does not change.

In one embodiment it is also possible to make the connection between the first rotating member 20a and the second rotating member 32a in such a way that the rotation of the two members is simultaneous but differentiated, for example according to a logic of proportionality so that each angle of rotation of the angular position of the first pedal P1 corresponds to a certain quantity (greater or lesser) of an angle of rotation of the angular position of the second pedal P2, or according to a different logic predetermined by design.

The second pin 34 is arranged inserted inside said second slotted hole 36. The second pin 34 has a generally rod-like shape, i.e., a simple cylinder, and is arranged for joint translation with with said second translating member 32b.

The shape of the second slotted hole 36 and its arrangement on the second support frame 30 are such that, when the second translating member 32b and the second pin 34 translate along the second slotted hole 36 following its cross section, the second support frame 30 is drawn in rotation about its second fulcrum F2 between the first angular position and the second angular position. In particular, when the motor 12 transmits, even indirectly, a driving torque to the second motion conversion mechanism 32, and in particular transmits a rotary motion to the second rotating member 32a, the rotary motion is converted into a translational motion of the second translating member 32b and, consequently, of the second pin 34 along the second slotted hole 36. In this way, the motor 12 may control, by generating a driving torque in one direction or the other, the angular position of the second support frame 30, and, consequently, of the second pedal P2 mounted thereon.

In particular, the second extension direction d2 of the second slotted hole 36 is arranged so as to be non-parallel to the second axis of rotation z2, and not to pass through the second fulcrum F2. Alternatively, the cross section of the second slotted hole 36 may be different, i.e., it may along an at least partially non-rectilinear path, for example curvilinear, in particular S-shaped or arched, so as to define a plurality of different angular positions of the second support frame 30. Preferably, the cross section of the first slotted hole 24 and the cross section of the second slotted hole 36 are the same.

The adjusting mechanism 10 may further comprise a second position sensor 38, adapted to determine the angular position of the second pedal P2 by detecting a correlated position. For example, the second position sensor 38 may be configured to detect the position of the second pin 34 inside the second slotted hole 36, or to detect the axial position of the second translating member 32b, or even to detect the angular position of the second rotating member 32a of an output shaft of the motor 12, or of the second support frame 30.

As is clear to those skilled in the art, the adjusting mechanism 10 according to the present invention may comprise an even greater number of pedal assemblies, for example three pedal assemblies, made in a similar way to the first pedal assembly 14 and to the second pedal assembly 28 and comprising similar components connected together in a similar manner to the connection between the first pedal assembly 14 and the second pedal assembly 28, and each pedal assembly for which the angular position is adjusted may also support a plurality of pedals mounted integrally thereto.

For controlling the motor 12, the adjusting mechanism 10 may further comprise an electronic control unit ECU configured to control the generation of drive torque by the motor 12 in one direction of rotation or the other according to the required angular position of the controlled pedal. For example, the electronic control unit may be configured to control activation of the motor 12 as a function of a command given by the driver or as a function of a position signal, for example, generated by the first position sensor 26 or by the second position sensor 38.

As is evident from the above description, the assembly comprising an adjusting mechanism according to the present invention provides several advantages.

First of all, by virtue of the use of an adjusting mechanism according to the present invention it is possible to jointly control the angular position of several pedals of a vehicle in a manner completely independent from the position of the seat or of the steering wheel. Furthermore, it is possible to adjust the angular position effortlessly even in the case of a disabled driver or a driver with motor difficulties.

Lastly, by virtue of the use of a motion conversion mechanism as described, and in particular through appropriate dimensioning of the pitch of the rotating member, the angular position of the first and of the second controlled pedal is ensured irreversibly and is securely fixed with respect to the driver's foot.

Finally, one of the distinctive advantages of the present invention is the simplicity of the technical solution, which allows easy assembly, as well as the possibility of producing the actuation system in a modular way (motor assembly, or gearmotor, and one or more motion conversion mechanisms).

Without prejudice to the principle of the invention, embodiments and constructional details may be modified with respect to those described and illustrated herein purely by way of non-limiting example, without thereby departing from the scope of protection as described and claimed herein.

What is claimed is:
1. An assembly for a vehicle, the assembly comprising:
an adjusting mechanism comprising:
a motor configured to generate and transmit a rotary motion;
a first pedal assembly comprising
a first support frame, rotatably supported on a first fulcrum and adapted to support a first pedal, said first support frame having a first slotted hole;
a first motion conversion mechanism, comprising a first rotating member, rotatable about a first axis of rotation, and a first translating member, the first motion conversion mechanism being configured to receive the rotary motion transmitted from the motor to the first rotating member and to convert said rotary motion into a translational motion of the first translating member; and
a first pin, arranged for joint translation with said first translating member and slidable inside said first slotted hole, in such a way that sliding of the first pin inside said first slotted hole draws the first support frame in rotation about the first fulcrum between a first angular position and a second angular position; and
a second pedal assembly, comprising
a second support frame, rotatably supported on a second fulcrum and adapted to support a second pedal, the second support frame having a second slotted hole;
a second motion conversion mechanism, comprising a second rotating member rotatable about a second axis of rotation, and a second translating member, the second motion conversion mechanism being configured to receive the rotary motion transmitted from the motor to the second rotating member and to convert said rotary motion into a translational motion of the second translating member; and
a second pin, arranged for joint translation with said second translating member and arranged slidable inside said second slotted hole, in such a way that sliding of the second pin inside said second slotted hole draws the second support frame in rotation about the second fulcrum between a first angular position and a second angular position,
wherein the first rotating member of the first motion conversion mechanism is connected to the motor so as to receive the rotary motion, and the second rotating member of the second motion conversion mechanism is rotatably connected to the first rotating member by a flexible transmission;
a first support structure arranged integral with a frame of the vehicle, and having a first guide slotted hole;
a second support structure, rotatably supported on a third fulcrum to allow a rotation of the second pedal assembly with respect to the first support structure, the second support structure having a second guide slotted hole, the second support frame being rotatably supported on the second support structure by the second fulcrum;
wherein the first support structure supports the motor, the first fulcrum, and the third fulcrum,
wherein the first pin is further arranged slidable inside said first guide slotted hole, and wherein the second pin is further arranged slidable inside said second guide slotted hole.

2. The assembly of claim 1, wherein the first rotating member is made as a first endless screw, and wherein the first translating member is made as a first scroll engaging with the first endless screw and adapted to translate axially along the first endless screw between a first position and a second position in response to a rotation of the first endless screw about the first axis of rotation.

3. The assembly of claim 1, wherein the second rotating member is made as a second endless screw, and wherein the second translating member is made as a second scroll engaging with the second endless screw and adapted to translate axially along the second endless screw between a first position and a second position in response to a rotation of the second endless screw about the second axis of rotation.

4. The assembly of claim 1, wherein said first slotted hole has an elongated cross section extending at least partially along a first extension direction non-parallel with the first axis of rotation.

5. The assembly of claim 1, wherein said second slotted hole has an elongated cross section extending at least partially along a second extension direction non-parallel with the second axis of rotation.

6. The assembly of claim 1, further comprising a first position sensor adapted to detect at least one among: an angular position of an output shaft of the motor, an angular position of the first rotating member, a position of the first pin, a position of the first translating member, and an angular position of the first support frame.

7. The assembly of claim 1, further comprising a second position sensor adapted to detect at least one among: an angular position of an output shaft of the motor, an angular position of the second rotating member, a position of the second pin, a position of the second translating member, and an angular position of the second support frame.

\* \* \* \* \*